United States Patent
Anderson, Jr.

[11] Patent Number: 6,069,805
[45] Date of Patent: May 30, 2000

[54] TWO STAGE POWER SUPPLY START UP CIRCUIT

[75] Inventor: Wayne Anderson, Jr., Dacula, Ga.

[73] Assignee: Motorola, Inc., Schaumburg, Ill.

[21] Appl. No.: 09/322,787

[22] Filed: May 28, 1999

[51] Int. Cl.$^7$ .......................... H02M 3/24; H02M 7/5387
[52] U.S. Cl. .................................. 363/49; 363/98; 363/132
[58] Field of Search ........................................ 363/49, 98, 41, 363/56, 62, 132; 325/285, 288, 299

[56] References Cited

U.S. PATENT DOCUMENTS

| | | | |
|---|---|---|---|
| 4,717,994 | 1/1988 | Diaz et al. | 363/21 |
| 4,941,076 | 7/1990 | Diaz | 363/49 |

*Primary Examiner*—Shawn Riley
*Assistant Examiner*—Rajnikant B. Patel
*Attorney, Agent, or Firm*—Felipe J. Farley; Philip H. Burrus, IV

[57] ABSTRACT

A two-stage power supply start up circuit is provided for pulse width modulator controllers that operate at a low steady state voltage. The invention provides for high-energy storage in low-capacitance start up capacitors by cascading switched start up stages, thereby allowing for the utilization of smaller, less expensive components. The invention utilizes a three-phase start up process with positive feedback ensuring both reliable start-up and steady state operation. The three phases are as "first phase start-up", which provides power to the control circuit, "second phase start-up", where the control chip starts switching, and "steady state", where the power supply runs in its normal mode.

6 Claims, 1 Drawing Sheet

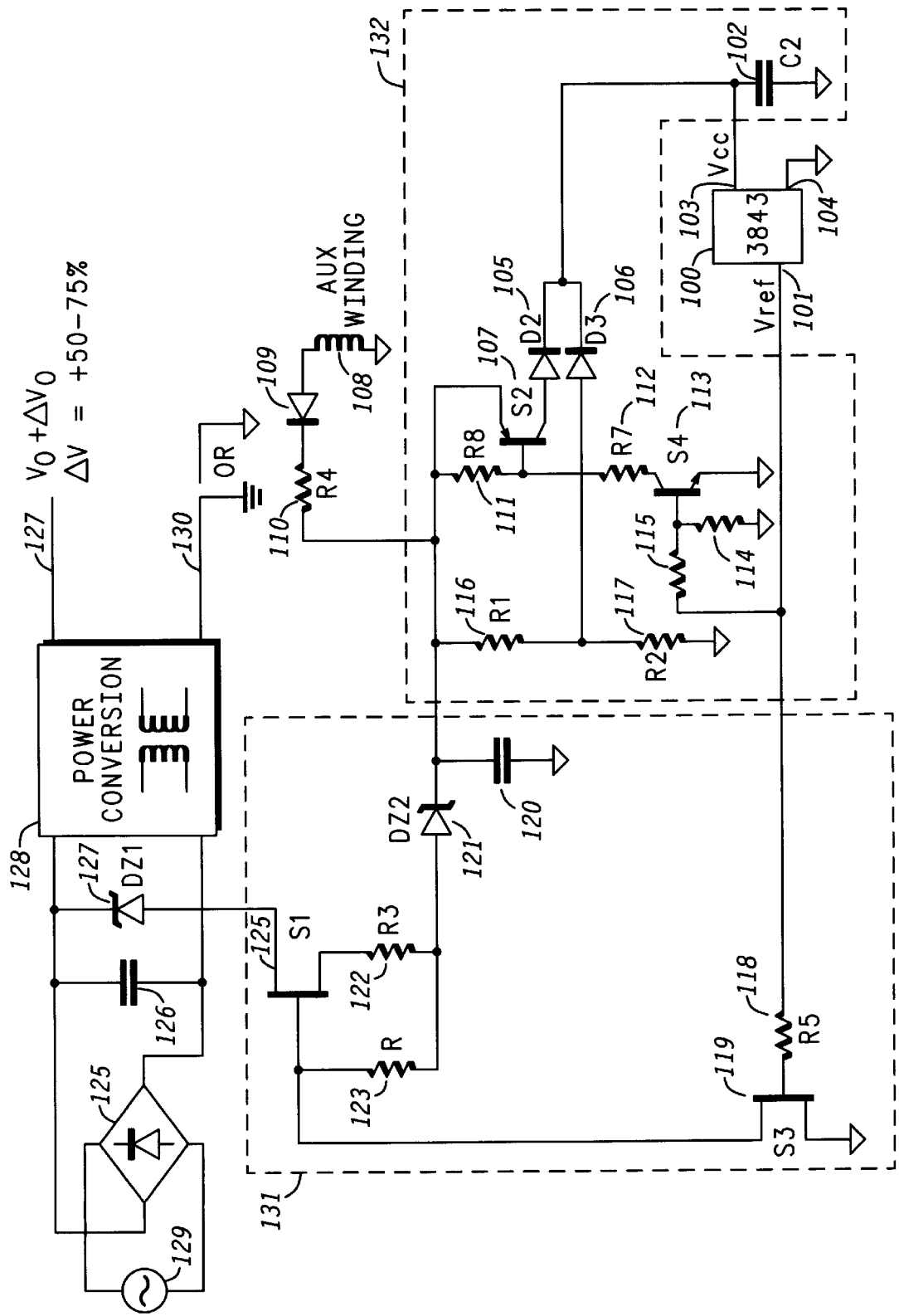

TWO STAGE POWER SUPPLY START UP CIRCUIT

TECHNICAL FIELD

The present invention relates generally to switch mode power supply circuits. More specifically, the present invention relates to start up circuits associated with Pulse Width Modulation (PWM) controllers in switch mode power supplies.

BACKGROUND

In AC to DC switch mode power supplies, the control circuitry is often powered by a bulk input storage capacitor during start-up, and then from an auxiliary winding on the transformer during steady state operation. The start-up circuitry, often called a "bootstrap" circuit, is intended to operate only during the transient start-up period, and must supply the control circuitry with enough energy to enable the power supply to reach steady state operation.

The energy stored in a capacitor is represented mathematically as $\frac{1}{2}CV^2$, where C is the capacitance value of the energy storage capacitor, and V is the voltage potential across the electrodes of the capacitor. As capacitance and voltage are inversely proportional relative to energy, in low voltage applications, the capacitance must be large to store enough energy to ensure proper power supply start-up. Large capacitors create several problems. First and foremost, they are expensive. Second, they are quite bulky. As power supplies become smaller and smaller, bulky parts constrain mechanical efficiency. Third, power supplies with bulky parts are hard to manufacture. There is therefore a need for an improved start up circuit that allows the sue of smaller capacitors.

SUMMARY OF THE INVENTION

This invention provides an improved start-up circuit for AC to DC switch mode converters using PWM controllers. The invention allows power supplies to use smaller, less expensive components for start-up circuits.

More specifically, this invention employs a two stage bootstrap circuit. The first stage provides a capacitor that charges to a relatively low voltage through a resistor divider coupled from the main supply. This capacitor provides just enough energy for initial start-up of the PWM controller, yet not enough energy for the power supply to reach steady state operation.

Upon initial start-up, the second stage provides a switch means to enable a second capacitor to supply energy to the PWM controller. This second stage capacitor has been charged to a higher voltage than the primary stage capacitor, allowing more energy to be stored without the need for a high capacitance component. The second stage capacitor combines with the first stage capacitor in order to deliver sufficient energy to the PWM controller for the power supply to reach steady state operation.

BRIEF DESCRIPTION OF THE DRAWINGS

The drawing is a schematic diagram of the start up circuit having a two-stage start up according to the present invention.

DETAILED DESCRIPTION OF THE DRAWINGS

In switch mode power supplies, a start-up circuit is generally employed to provide the Pulse Width Modulator (PWM) controller enough energy to begin switching the power transistor. Once the PWM controller has begun switching, a winding of the power transformer takes over and supplies the necessary power to the controller. Often, the winding used to power the PWM controller is an additional or auxiliary winding of the transformer. Typically, the auxiliary winding is poorly regulated due to its auxiliary function.

Typical start-up circuits comprise a capacitor coupled to the main power source through a current limiting resistor. When external power is applied to the supply, a "trickle" current flows through the resistor into the capacitor. Once the capacitor charges to a sufficient voltage, the PWM controller uses the energy stored in the capacitor to power itself during start-up.

Many standard PWM controllers have relatively high start-up voltage requirements. The voltage required to power the PWM range between 10 and 12 volts. The steady state operating voltage supplied by the auxiliary winding tends to vary due to its poor regulation. Furthermore, most modern switch mode power supplies use Field Effect Transistors (FETs) as the main switch in the power conversion circuitry. These FETs are generally of the Metal Oxide Semiconductor (MOS) variety, which have maximum ratings for the voltage that can be applied to the gate of the device. This voltage limit is typically 20 volts. If the voltage supplied by the auxiliary winding of the transformer ever exceeds the voltage limit of the gate of the FET, damage to the FET is likely and the power supply will become disabled.

In a normal power supply, where the output voltage is tightly regulated, an auxiliary winding that is designed to produce a voltage of 10–12 volts will typically not exceed the 20 volt maximum dictated by the FET limit. Sometimes, however, the output of the power supply is called upon to have a dynamic output. This occurs when the output voltage must shift in relation to an external feedback signal. When this occurs, wide voltage variations appear across the terminals of the auxiliary winding. These variations can be 50 to 75% or more, causing the auxiliary winding voltage to exceed 20 volts.

A known solution that can be used to limit the voltage is connecting a zener diode across the terminals of the auxiliary winding. This solution is not desirable, however, as a zener diode would dissipate energy, thereby producing heat. As energy per unit volume is becoming larger and larger, heat dissipation becomes a big problem. The zener solution therefore becomes unfeasible.

Several PWM controllers have been designed with lower steady state operating voltages. These devices allow more headroom between the minimum operating voltage required by the PWM controller and the maximum voltage allowed by the FET. The current state of the art PWM controllers have an operating voltage of approximately 7.6 volts. For example, the UC3483 controller, manufactured by Motorola and Unitrode, has an operating voltage of about 7.6 volts.

These PWM controllers typically have a tight start-up ranges, however. This means that while 8.4 volts will cause the PWM controller to start, if that voltage falls below 7.6 volts the controller will stop running due to the under voltage lockout feature. Abnormal low-input conditions can cause the supply to get hot or produce an unregulated output. Manufacturers recognize this and add an under-voltage lockout feature to automatically shut off the PWM controller under such low input voltage conditions. The net result is that a relatively large amount of energy at a relatively low voltage is required to power the PWM controller until the auxiliary winding takes over. As mentioned, the energy stored in a capacitor is given by ½CV², where C is the capacitance value of the energy storage capacitor, and V is the voltage potential across the electrodes of the capacitor. When the input voltage is required to be low, as dictated by PWM controller limits or power FET requirements, the capacitance required to store enough energy to start a typical controller can be quite high.

To illustrate by example, for a PWM controller with a start up window of 10 to 16 volts, the energy required to start the part can be stored in a 47 uF capacitor. If the start up window changes to 7.6 to 8.4 volts, start-up hysteresis, the lower voltage, and the narrower start-up window require a 500 uf capacitor. This part is large, expensive and bulky.

This invention offers a novel approach allowing power supply designers to employ small capacitors for the start-up function. While the specification concludes with claims defining the specifics of the invention that are regarded as novel, the invention will be better understood from a consideration of the following description in conjunction with the drawings, in which like reference numbers are carried forward.

Referring now to the drawing, the present invention incorporates a two-stage start up circuit 131 and 132. In so doing, the invention takes advantage of the fact that energy is proportional to square of the voltage as well as capacitance. By charging a capacitor to a higher voltage, more energy can be stored without the need of a larger capacitor.

Per the present invention, there are three phases of start-up in the two stage start-up circuit. For discussion purposes, these will be referred to as "first phase start-up", "second phase start-up", and "steady state".

The drawing shows a schematic diagram of a start-up circuit for use with a power supply in accordance with the invention. To begin, consider that S1 123 is closed, with S2 107, S3 119, and S4 113 open. The power source 124 illustrated is an AC source, but the invention would work as well with a DC source. When power is first applied to the circuit, the diode bridge 125 rectifies the input signal and the bulk input capacitor 126 filters the output of the rectifier bridge so that a substantial DC voltage is obtained. The DC voltage causes current to trickle into C1 120 through S1 123 and R3 122, allowing C1 120 to charge. Simultaneously, the trickle current through R3 122 flows through the resistive divider, R1 116 and R2 117, then through the forward biased D3 106, charging C2 102. Note that C2 102 charges to a fraction of the voltage across C1 120 due to the voltage divider created by R1 116 and R2 117. This fraction is easily changed by scaling R1 116 and R2 117. For the present discussion, assume that the voltage across C2 102 is half that across C1 120.

Once the voltage across C2 102 reaches the start up voltage associated with the PWM controller 100, the circuit has entered first phase start up. C2 102 now begins supplying energy to the PWM controller 100. In the first phase of start up, S1 123 is closed, S2 107, S3 119, and S4 113 are open and the auxiliary winding 108 is not energized.

Once the PWM controller 100 becomes energized, a voltage appears at the voltage reference terminal 101. The appearance of a voltage on this terminal 101 is the equivalent of the terminal 101 transferring from a low to a high state. This is the beginning of second phase start up. As the reference terminal 101 is now high, S2 107, S3 119, and S4 113 are caused to close. When S3 119 closes, S1 123 opens. When S2 107 and S4 113 close, the energy stored in C1 120 is transferred to C2 102 and the PWM controller 100 through S2 107 and the forward biased D2 105.

At the beginning of second phase start-up, the auxiliary winding 108 is still not energized. C1 120 provides the PWM controller 100 with enough energy to drive a switching element. The net effect of the circuit is to effectively transform the start-up window of the PWM controller 100 from a typical 7.6 to 8.4 volts to a window of 7.6 to 16.8 volts. The result of this widening of the window is that a designer is now able to employ smaller, more cost effective capacitors 120 and 102.

The end of second phase start-up is marked by the auxiliary winding 108 becoming energized. When this occurs, the auxiliary winding 108 supplies the necessary energy to power the PWM controller 100 and the circuit has reached steady state operation.

Once in steady state operation, DZ2 121 takes on special significance. As the auxiliary winding 108 is now supplying energy, DZ2 121 changes in operation from a forward biased diode to a reverse biased zener, providing a positive voltage to the source of S1 123. S3 119 remains closed, shorting the gate of S1 123 to ground. This creates a negative gate to source bias across S1 123, reliably turning off S1 123. The trickle function is consequently terminated during steady state operation.

Further, as the reference terminal of the PWM controller 101 is high during steady state, S2 107 and S4 113 are reliably closed, allowing the auxiliary winding 108 to reliably power the PWM controller 100, in turn keeping the reference terminal high 101. This positive feedback provides a latching function for S2 107 and S4 113, ensuring proper operation of the auxiliary winding 108 as the voltage source for the PWM controller 100 in steady state.

This invention overcomes the conflicting requirements of high start-up voltage and low steady state requirements associated with high energy, low capacitance capacitors. In other words, traditional PWM controllers having a 10–12 volt operating window, coupled with loosely regulated auxiliary windings of transformers, could damage the power FET, as it has a maximum voltage requirement of 20 volts. This invention utilizes lower voltage PWM controllers to avoid damaging the power FET. The lower voltage PWM controller, has an inherent problem in that it requires a large capacitance capacitor to start. The present invention solves this issue by switching two capacitors, allowing for the use of lower-capacitance, smaller capacitors, while protecting the power FET and during start-up and steady state.

Further, it allows easy scaling of the voltage across C2 102 with the resistive divider R1 116 and R2 117. In so doing, C2 102 can be readily optimized for size, capacitance, voltage, etc.

This invention also reduces wasted energy in the auxiliary winding 108 by allowing the designer to select a lower steady state operating voltage for the winding 108. In so doing, excessive voltage drive to a power switching element is eliminated.

What is claimed is:

1. A power supply start-up circuit comprising:
   a pulse width modulator controller with a voltage reference terminal;
   a first capacitor, C1, coupled by a first switch means, S1, to said power source;
   at least two resistors, R1 and R2, coupled in series to form a resistive divider from said first capacitor, C1, to ground;
   a second capacitor, C2, coupled to the interconnection of said resistors, R1 and R2;

a second switch means, S2, coupled in series between said first capacitor, C1, and said second capacitor, C2;

a power conversion transformer with an auxiliary winding coupled to said first capacitor, C1;

a first zener diode, DZ1, coupled in series between S1 and said power source, with anode towards S1 and cathode towards said power source;

a second zener diode, DZ2, coupled in series between S1 and C1, with anode towards S1 and cathode towards C1;

a first diode, D1, coupled in series between said auxiliary winding and C1, with anode towards said auxiliary winding and cathode towards C1;

a second diode, D2, coupled in series between S2 and C2, with anode towards S2 and cathode towards C2; and a third diode, D3, coupled in series between the interconnection of R1 and R2 and C2, with anode towards R1 and R2 and cathode towards C2;

wherein when S1 is closed with S2 open, C1 and C2 charge, when C2 charges to a predetermined voltage, C2 supplies power to the pulse width modulator controller; and further wherein when S1 is open with S3 closed, C1 supplies power to the pulse width modulator controller.

2. A power supply circuit as described in claim 1, further comprising:

a resistive means, R3, for limiting current coupled in series between said first switch means, S1, and said first capacitor, C1; and a resistive means, R4, for limiting current coupled in series between said auxiliary winding and said first capacitor, C1.

3. A power supply circuit as described in claim 2 further comprising a third switch means, S3, for actuating S1; and a fourth switch means, S4, for actuating S2.

4. A power supply circuit as described in claim 3 wherein said first switch means S1 comprises a depletion mode field effect transistor having collector coupled to DZ2 and emitter coupled to R3;

said second switch means, S2, comprises a p-channel bipolar junction transistor with emitter coupled to C1 and collector coupled to D2;

said third switch means, S3, comprises an enhancement mode field effect transistor with collector coupled to the gate of S1, emitter coupled to ground, and gate coupled to said reference terminal of the pulse width modulator integrated circuit; and said fourth switch means, S4, comprises an n-channel bipolar junction transistor with collector coupled to the base of S2, emitter coupled to ground, and base coupled to said reference terminal of the pulse width modulator integrated circuit.

5. A device as described in claim 4 further comprising a resistive means, R5, for limiting current coupled in series between the gate of S3 and the voltage reference terminal of said pulse width modulator integrated circuit;

a resistive means, R6, for voltage pull down coupled between the gate and collector of S1;

a resistive means, R7, for limiting current coupled in series between the collector of S4 and the base of S2;

a resistive means, R8, for voltage pull up coupled between the base and emitter of S2.

6. A method for starting a power supply circuit having a pulse width modulator controller with a voltage reference terminal, a first capacitor, C1, coupled by a first switch means, S1, to said power source, at least two resistors, R1 and R2, coupled in series to form a resistive divider from said first capacitor, C1, to ground, a second capacitor, C2, coupled to the interconnection of said resistors, R1 and R2, a second switch means, S2, coupled in series between said first capacitor, C1, and said second capacitor, C2, a power conversion transformer with an auxiliary winding coupled to said first capacitor, C1, a first zener diode, DZ1, coupled in series between S1 and said power source, with anode towards S1 and cathode towards said power source, a second zener diode, DZ2, coupled in series between S1 and C1, with anode towards S1 and cathode towards C1, a first diode, D1, coupled in series between said auxiliary winding and C1, with anode towards said auxiliary winding and cathode towards C1, a second diode, D2, coupled in series between S2 and C2, with anode towards S2 and cathode towards C2, and a third diode, D3, coupled in series between the interconnection of R1 and R2 and C2, with anode towards R1 and R2 and cathode towards C2, the method comprising the steps of:

applying an input electrical power;

closing said first switch means, S1, and opening said second switch means, S2, allowing said first capacitor, C1, and said second capacitor, C2, to charge, said second capacitor, C2, charging through said resistive divider, R1 and R2;

allowing said second capacitor, C2, to charge to a voltage level sufficient to start said pulse width modulation controller; and closing said second switch means, S2, and opening said first switch means, S1, thereby creating an electrical connection between said first capacitor, C1, said second capacitor, C2, said auxiliary winding of said power conversion transformer, and said pulse width modulation controller.

* * * * *